(12) United States Patent
Mahrous et al.

(10) Patent No.: US 10,089,473 B2
(45) Date of Patent: Oct. 2, 2018

(54) SOFTWARE NOMENCLATURE SYSTEM FOR SECURITY VULNERABILITY MANAGEMENT

(71) Applicants: Hesham Mahrous, Vancouver (CA); Navjot Singh, Vancouver (CA); Govind Preet Singh, Vancouver (CA); Shiu Kung, Vancouver (CA); Justine Shan, Vancouver (CA); Baljeet Singh Malhotra, Vancouver (CA)

(72) Inventors: Hesham Mahrous, Vancouver (CA); Navjot Singh, Vancouver (CA); Govind Preet Singh, Vancouver (CA); Shiu Kung, Vancouver (CA); Justine Shan, Vancouver (CA); Baljeet Singh Malhotra, Vancouver (CA)

(73) Assignee: SAP SE, Walldorf (DE)

( * ) Notice: Subject to any disclaimer, the term of this patent is extended or adjusted under 35 U.S.C. 154(b) by 326 days.

(21) Appl. No.: 14/582,810

(22) Filed: Dec. 24, 2014

(65) Prior Publication Data

US 2016/0188882 A1 Jun. 30, 2016

(51) Int. Cl.
*G06F 21/00* (2013.01)
*G06F 21/57* (2013.01)
*G06Q 50/00* (2012.01)

(52) U.S. Cl.
CPC ............ *G06F 21/577* (2013.01); *G06F 21/57* (2013.01); *G06Q 50/00* (2013.01); *G06F 2221/033* (2013.01)

(58) Field of Classification Search
CPC ........ G06F 21/57; G06F 21/577; G06Q 50/00
See application file for complete search history.

(56) References Cited

U.S. PATENT DOCUMENTS

| 7,664,343 | B2 | 2/2010 | Withum et al. |
| 7,788,536 | B1 | 8/2010 | Qureshi et al. |
| 7,810,071 | B2 | 10/2010 | Thebes et al. |
| 7,949,732 | B1 | 5/2011 | Roesch et al. |
| 7,987,390 | B2 | 7/2011 | Chandrasekaran |
| 8,156,208 | B2 | 4/2012 | Bornhoevd et al. |
| 8,195,546 | B2 | 6/2012 | Wefers et al. |
| 8,250,651 | B2 | 8/2012 | Huang et al. |

(Continued)

*Primary Examiner* — Jeffrey Pwu
*Assistant Examiner* — Thong Truong
(74) *Attorney, Agent, or Firm* — Brake Hughes Bellermann LLP (57) ABSTRACT

Systems and methods for securing a computer system are described herein. The systems and methods, which are computer-implemented, involve receiving, by a computing device, a name of a software vulnerability. The computing device measures a lexical similarity distance between the vulnerability name and each name in a list of names of software systems and components of the computer system. The computing device further identifies the software system and component names that are within a predetermined similarity distance of the vulnerability name as corresponding to software systems and components having the software vulnerability. Once the vulnerabilities are detected and mapped to corresponding software systems and components, the systems and methods can generate derivative works (e.g., reports, charts, and other derivative data) for further data processing, storage or analysis by different stake holders and/or other computing devices.

17 Claims, 4 Drawing Sheets

(56) References Cited

U.S. PATENT DOCUMENTS

| | | |
|---|---|---|
| 8,392,996 B2 | 3/2013 | Oliver et al. |
| 8,453,245 B2 | 5/2013 | Rogers et al. |
| 8,544,098 B2 | 9/2013 | Gustave et al. |
| 8,707,385 B2 | 4/2014 | Jain et al. |
| 8,732,183 B2 | 5/2014 | Soel et al. |
| 8,781,815 B1 | 7/2014 | Gidney |
| 8,782,603 B2 | 7/2014 | Plate |
| 9,569,201 B1* | 2/2017 | Lotem .................. G06F 8/70 |
| 2012/0159625 A1* | 6/2012 | Jeong ................ G06F 21/562 726/23 |

* cited by examiner

FIG. 1

210
Receive, by a computer, a CPE-formatted name of a vulnerability (e.g., $X_{new}$)

220
Search CPE-formatted name data records in database for software system or component names that match the vulnerability name (e.g., $X_{new}$) attribute field-by-attribute field

222
Perform a first search on a vendors "dimension" of the database to identify data records having vendors matching the vendor attribute of $X_{new}$

224
Perform a second search on the product dimension of the data records with matching vendors to identify data records having products matching the product attribute of Xnew

226
Perform a third search on the version dimension of the data records with matching vendors and/or products to identify data records having versions matching the version attribute of Xnew

230
Use the results of the foregoing first, second and third searches for CPE-formatted names in the database that match the attributes of vulnerability name $X_{new}$ to identify vulnerable software systems or components in the computer system

232
In cases where there is no "exact" match found for the vendor, product or version attributes, identify a probable matching data record

234
Calculate a "matching" confidence level for the probable matching data record

SOFTWARE NOMENCLATURE SYSTEM FOR SECURITY VULNERABILITY MANAGEMENT

BACKGROUND

Businesses and organizations world wide rely more and more on networked computer systems for information and services. The computer systems can include computing devices such as computers and smartphones, as well as computer networks such as private and public networks (including the Internet). A business' computer system may have a software codebase of hundreds or thousands of different computer applications or software ("software systems"). The software codebase may be continually changing, upgraded or enlarged with newer versions or types of the computer applications or software. Establishing good computer security (which may include processes and mechanisms by which equipment, information and services are protected from unintended or unauthorized access, change or destruction) is essential for operation of the business' computer system.

A computer security or software "vulnerability" may be a weakness or mistake in a software system that can be directly used by an unauthorized third party to gain access to a computer system or network. In several reported incidents of cyber attacks on computer systems of various businesses and organizations, attackers have breached computer security (e.g., using computer viruses, worms, Trojan horses, ransomware, spyware, adware, scareware, and other malicious programs) only because of vulnerabilities in the software codebase in the computer systems. Most businesses or organizations recognize a need for continually monitoring of their computer systems to identify software at risk not only from known software vulnerabilities but also from newly reported vulnerabilities (e.g., due to new computer viruses or malicious programs). Identification of vulnerable software allows prophylactic actions to be taken, for example, to secure the vulnerable software and prevent breaches of computer security. The prophylactic actions may, for example, include deploying specific anti-virus software or restricting operation of the vulnerable software to limit damage.

New computer system or software system vulnerabilities are often identified, cataloged, and published by independent third parties or organizations ("reporting parties") who may specialize in computer security issues. The reporting parties may include government organizations (e.g., National Institute for Standards and Technology (NIST)), industry organizations, and private firms (e.g., for example, anti-virus software developers).

Consideration is being given to systems and methods for identifying computer systems at risk from software vulnerabilities that may be reported by reporting parties.

SUMMARY

Systems and methods for securing a computer system from new or previously known and named software vulnerabilities are described herein. The computer system may deploy various software systems and components and may have a list of names of the deployed software systems and components stored in a database. The various deployed software systems and components may be susceptible to one or more of the new or previously known and named software vulnerabilities.

In a general aspect, a method includes receiving, by a computing device, a name of a software vulnerability and measuring a lexical similarity distance between the vulnerability name and each of the software system and component names in the list of deployed software system and component names stored in the database. The method further includes identifying the software system and component names that are within a pre-determined similarity distance of the vulnerability name as corresponding "vulnerable software" i.e. to software systems and components having the software vulnerability, and outputting, to at least one computer system stakeholder, agent or other computing device, names of software systems and components having the software vulnerability.

In a further aspect, outputting names of software systems and components having the software vulnerability may include generating derivative works (e.g., reports, charts, other derivative data, etc.). The derivative works may be further processed, stored or analyzed by various stakeholders, agents or computing devices. The stakeholders, agents or computing devices may, for example, process the derivative works to generate immediate or long term remedial actions to secure the computer system.

The details of one or more implementations are set forth in the accompanying drawings and the description below. Further features of the disclosed subject matter, its nature and various advantages will be more apparent from the accompanying drawings the following detailed description, and the claims.

DETAILED DESCRIPTION

Systems and methods for securing a computer system are described herein. The systems and methods, which are computer-implemented, may involve identifying vulnerable computer applications or software systems and components deployed in the computer system, in accordance with the principles of the present disclosure. The vulnerable software systems or components deployed in the computer system may be automatically identified as such by comparing names of the deployed software systems and components with the names of software systems that have been cataloged or reported as being vulnerable (e.g. in vulnerability reports that may be published by public or private third party computer security organizations (e.g., NIST)).

Under the Common Vulnerabilities and Exposure (CVE) initiative and other such initiatives, an information security "vulnerability" is defined as a mistake in software that can be directly used by an attacker to gain access to a system or network. A mistake may be a vulnerability if it allows an attacker to use it to violate a reasonable security policy for that system. The vulnerability may be a state in a computing system (or set of systems) that either allows an attacker to execute commands as another user, allows an attacker to access data that is contrary to the specified access restrictions for that data, allows an attacker to pose as another entity, or allows an attacker to conduct a denial of service. Examples of vulnerabilities may include: phf (remote command execution as user "nobody"); rpc.ttdbserverd (remote command execution as root); world-writeable password file (modification of system-critical data); default password (remote command execution or other access); denial of service problems that allow an attacker to cause a Blue Screen of Death; smurf (denial of service by flooding a network); etc.

Further under the CVE and other such initiatives, an information security "exposure" is defined as a system configuration issue or a mistake in software that allows access to information or capabilities that can be used by an attacker or hacker as a steppingstone into a system or network. A system configuration issue or a mistake may be an exposure if it does not directly allow compromise but could be an important component of a successful attack, and is a violation of a reasonable security policy. An information security "exposure" describes a state in a computing system (or set of systems) that is not a vulnerability, but either allows an attacker to conduct information gathering activities, allows an attacker to hide activities, includes a capability that behaves as expected, but can be easily compromised, or is a primary point of entry that an attacker may attempt to use to gain access to the system or data, or is considered a problem according to some reasonable security policy.

Examples of exposures may include: running services such as finger (useful for information gathering, though it works as advertised); inappropriate settings for auditing policies; running services that are common attack points (e.g., HTTP, FTP, or SMTP); use of applications or services that can be successfully attacked by brute force methods (e.g., use of trivially broken encryption, or a small key space); etc.

For convenience in description herein the terms "vulnerability," "software vulnerability," "software system vulnerability" or "computer system vulnerability" may be used interchangeably, and each term may collectively refer to both information security "vulnerability" and information security "exposure."

A computer security organization that catalogs or reports computer system vulnerabilities may use an industry naming standard (software nomenclature) to report software system vulnerabilities. For example, NIST, which investigates and reports software system vulnerabilities, subscribes to the Common Platform Enumeration (CPE) standard for naming software systems. The industry naming standards may provide guidance on how software systems should be named so that the reported vulnerabilities can be mapped to the exact same software systems in a business or organization's computer system regardless of who is reporting those vulnerabilities. The standardized naming of software systems for vulnerability reporting may enable various stakeholders across different entities and organizations to share vulnerability reports and other information in a commonly understood format.

Unfortunately, many of the existing software systems pre-date use of the naming standards for the software nomenclature used in reporting vulnerabilities. The names of the existing or pre-deployed software systems may not comply with the software naming standards now used (e.g., by NIST) for reporting vulnerabilities. For instance, a business or organization may refer to or name a pre-deployed software component in its computer system as "my.program.js", however, NIST under the CPE standard, may report a vulnerability on this particular software component as "org_program_js". Further, even when common naming standards are used for software systems or components, other identifying information related to the software systems or components such as versions, updates and editions may be represented or named differently by different businesses and organizations. In particular, this other identifying information related to a software system may be represented or named differently by a business organization than the representation or name used for the other identifying information in the standardized vulnerability reports published by the third party computer security organizations.

An organization may attempt to standardize the nomenclature of the software systems used in the organization's computer systems. However, for a large organization, due to the vast number of different software system products used, the standardization attempt may not be successful or complete. The software systems in the organization's computer systems may be left with imprecise names even after the standardization attempt. Further, any free and open-source software (FOSS) systems deployed in the organization's computer systems are likely to have unstandardized names.

The systems and methods for identifying vulnerabilities in the organization's computer systems, described herein, may be configured to process imprecise data (i.e. imprecise or unstandardized software names) and, yet, effectively identify and monitor software system vulnerabilities in the computer systems. The systems and methods may be configured to find the exact software systems (e.g., from hundreds and thousands of software systems in the organization's computer systems), albeit imprecisely named software systems, which are affected by vulnerabilities reported by third parties (e.g., NIST).

The systems and methods may involve name matching solutions, which may map standardized vulnerability names data (i.e., names in the software vulnerability reports) to the imprecise or unstandardized names data (i.e., the names of software systems) based on a lexical distance measurement, in accordance with the principles of the disclosure herein. The name matching solutions for name matching and lexical distance measurements described herein may be implemented on one or more standalone or networked physical or virtual computing machines.

Figure 1:
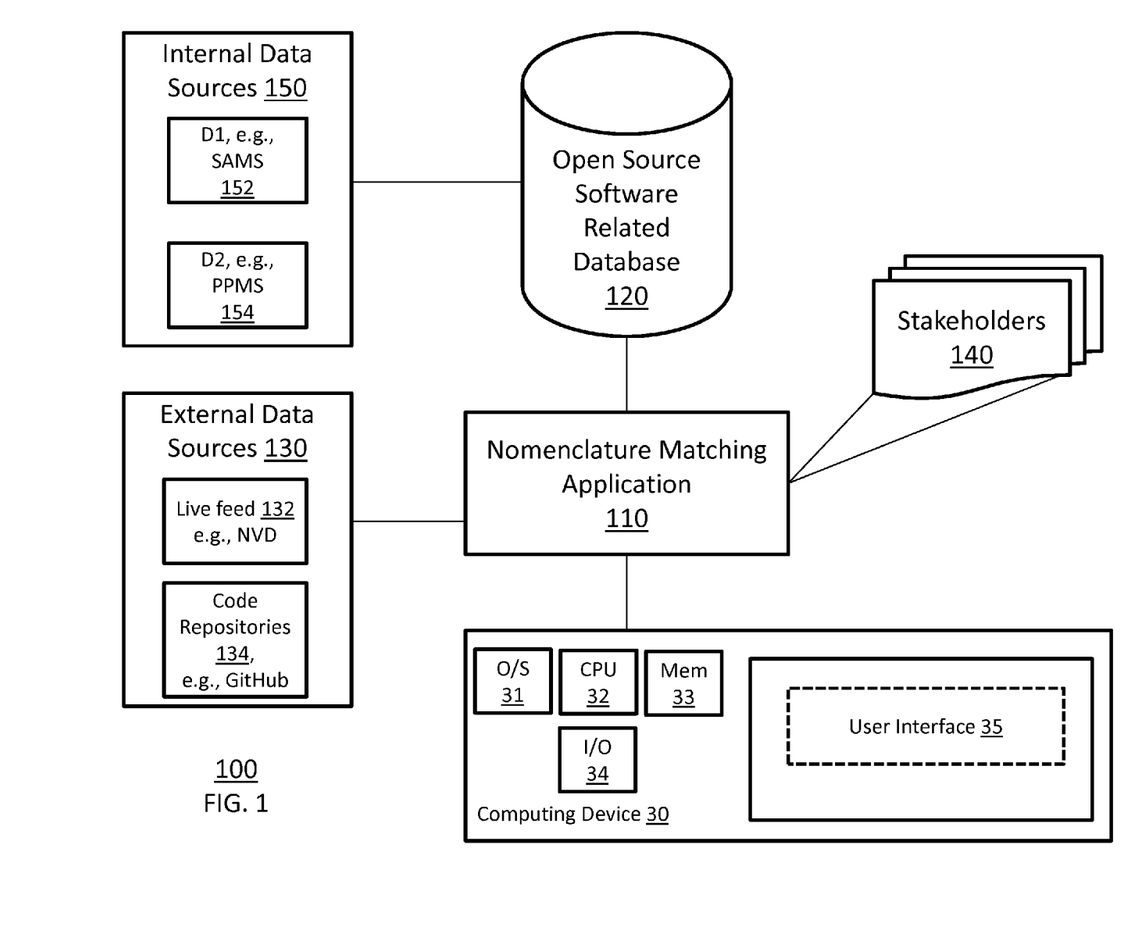
FIG. 1 is a block diagram illustrating an example name matching system, which includes a nomenclature matching application coupled to a "software system names" database and a source of reported software system vulnerabilities, in accordance of the principles of the present disclosure.

FIG. 1 shows, for example, a name matching system 100, which includes a nomenclature matching application 110 coupled to a "software system names" database 120 and one or more sources of reported software system vulnerabilities, in accordance of the principles of the present disclosure.

Nomenclature matching application 110 may be hosted on one or more standalone or networked physical or virtual computing machines in or connected to the organization's computer systems. In the example implementation shown in FIG. 1, nomenclature matching application 110 may be hosted on a computing device 30 (e.g., a desktop computer, a mainframe computer, a server, a personal computer, a mobile computing device, a laptop, a tablet, or a smart phone), which may be available to a user. Computing device 30, which includes an O/S 31, a CPU 32, a memory 33, and I/O 34, may further include or be coupled to a display 35 (including, for example, a user interface 35).

Moreover, although computer 30 is illustrated in the example of FIG. 1 as a single computer, it may be understood that computer 30 may represent two or more computers in communication with one another. Therefore, it may also be appreciated that any two or more components of system 100 may similarly be executed using some or all of the two or more computing devices in communication with one another. Conversely, it also may be appreciated that various components illustrated as being external to computer 30 may actually be implemented therewith.

Software system names database 120, which may, for example, be a real-time database, may include a listing of names (e.g., name1, name2, etc.) of various software systems or components deployed in the organization's computer systems. The listing of names may include one or more names that are imprecise, unstandardized and/or standardized (e.g., name which conform to the CEP standard). A software system or component name (e.g., name1, name2, etc.) included in the listing may include one or more name attributes (e.g., a Vendor Name: an identified vendor for the software system or component; a Product Name: a name of the software system or component; a Version: a version (update/edition) identifier of the software system/component; etc.).

In system 100, the one or more sources of reported software vulnerabilities may be a database or a link to a database that contains data or information on reported software vulnerabilities. In an example implementation of system 100 shown in FIG. 1, the one or more sources of reported software vulnerabilities may include external data sources (e.g., external data sources 130) or internal data sources (e.g., internal data sources 150). External data sources 130 may, for example, include live data feed 132 and/or external code repositories 134. Live data feed 132 may, for example, be an online data feed from third-party suppliers of software vulnerability information. An example online data feed may be the online data feed from the National Vulnerabilities Database (NVD), which a government maintained repository of standards-based vulnerability management data. The online data feed from the NVD may, for example, include security checklists, security related software flaws, misconfigurations, product names, and impact metrics, etc. In particular, the data feed may include vulnerability data (e.g., a Common Vulnerability and Exposure (CVE) data feed or other data feeds), which identifies by name the software components (e.g., X1, X2, X3, etc.) corresponding to the reported vulnerabilities. External code repositories 134 may include web-based services that can provide, for example, vulnerability data, software bugs and issues data, and source code management (SCM) functions, etc. External code repositories 134 may for example, include GitHub, which is a web-based code repository hosting service with distributed revision control and source code management (SCM) functionality. Further, in system 100 internal data sources 130 (which may be internal to the organization's computer systems) may include one or more systems (e.g., Software Approval Management System (SAMS) 152 and Product and Production Management System (PPMS) 154) having software vulnerability data and other information related to the software deployed in the organization's computer systems.

Nomenclature matching application 110 may be configured to identify vulnerable software components in the organization's computer system by matching names (e.g., of newly or previously published vulnerabilities) in the vulnerability data (e.g., X1, X2, X3, etc.) with software system or component names (e.g., name1, name2, etc.) in software systems names database 120. Nomenclature matching application 110 may also be connected to internal systems (e.g., SAMS 152 and PPMS 154) that may contain vulnerability data and information, for example, on software systems or components that may be installed or be considered for installation in the organization's computer systems. Nomenclature matching application 110 may evaluate the software systems or components for vulnerabilities by matching names of vulnerabilities in the vulnerability data (e.g., X1, X2, X3, etc.) with the software system or component names.

Nomenclature matching application 110 may use a lexical distance matching method or algorithm to identify a software system or component name (e.g., name2) in database 120 as matching (i.e. being the same or lexically equivalent to) a particular vulnerability name (e.g., X1). In addition to identifying a vulnerable software system or component in the organization's computer systems by name, nomenclature matching application 110 may identify computer applications or programs that use the vulnerable software system or component. Nomenclature matching application 110 may generate "security" alerts for owners or users of the computer applications or programs that use the vulnerable software system or component.

System 100 may send or output the vulnerability name matching results and security alerts generated by nomenclature matching application 110 to various stakeholders 150 (e.g., application owner/users, security teams, system administrators, agents, etc.) who may be affected by or can act on the reported vulnerabilities. The stakeholders or agents may, for example, be organizational entities (e.g., IT administrators) or machine entities (e.g., other computing devices or software modules), which have been granted privileges to access parts of the organization's computer systems to correct or mitigate the vulnerabilities identified by nomenclature matching application 110. Correction or mitigation of the vulnerability may, for example, include blocking access to, blocking operation of, and patching, replacing or removing the vulnerable software. Correction or mitigation of the vulnerability may also include scanning the computer system for viruses or other malware that may have been introduced, and removing the viruses or other malware.

System 100 may be configured to generate various kinds of derivative works (e.g., reports, charts, derivative data, etc.) based upon the identification of vulnerable software systems and components in the organization's computer systems. These derivative works may be generated, for example, immediately each time a vulnerable software system or component identified, or after a cumulative or periodic time interval of choice. The derivative works may be delivered to other entities (e.g., stakeholders, agents, computing devices, software services, etc.) for further data processing, storage and analysis, which may, for example, be relevant to securing the organization's computer systems.

As noted earlier, nomenclature matching application 110 may use a lexical distance measurement to determine if two names (e.g., a software system name and a vulnerability name) are the same or lexically equivalent names. The distance measurement may involve measuring a similarity between two text strings (i.e. the two names). The methods (e.g., Jaro-Winkler, Levenshtien and other distance measuring methods described herein) used by nomenclature matching application 110 to measure the similarity between two strings may be based on recognition of human cognitive capabilities in perceiving two unequal or different text strings as being equal. The methods to measure the similarity between two text strings may recognize that humans perceive missing consonants and missing vowels differently when determining if two different text strings are the same word. The methods to measure the similarity between two text strings may also recognize the so-called "typoglycemia" ability of humans to understand the meaning of a misspelled word as long as the exterior letters (e.g., prefix and suffix letters) of the word are correct and all the letters of the word are present.

In particular based on principles learnt from studies of human cognition, the methods to measure the distance or the similarity between two text strings may consider insertion, deletion, transposition of characters and consonants in the two strings of the same word to be artifacts of the imprecise software systems nomenclature.

Example of these artifacts may be follows:
Deletion of characters and consonants: example "chocolate", and "cholate"
Erroneous insertion of characters: example apple" and "abple"
Transposition of characters: example "Microscope" and "Mircoscope"
Misplacement of characters: example "Microsoft" and "Microofst"

A Jaro-Winkler distance measurement method may, for example, may use a prefix scale, which favors strings that match from the beginning for a set prefix length (e.g., first four digits or characters). The Jaro-Winkler distance measurement method may be used to measure the distance $d_w$ between the two (e.g., unequal) text strings S1 and S2 taking into account missing characters, transposition, and a first four digits prefix match. The Jaro-Winkler distance measurement method may be implemented by nomenclature matching application 110 by comparing and matching each character of text string S1 with characters of text string S2 using nested loops. The distance $d_w$ between the two unequal text strings S1 and S2 may be calculated from a mathematical formula:

$$d_j = \begin{cases} 0 & \text{if } m = 0 \\ \frac{1}{3}\left(\frac{m}{l_{s1}} + \frac{m}{l_{s2}} + \frac{m-t}{m}\right) & \text{otherwise} \end{cases}$$

$$d_w = d_j + lp(1 - d_j)$$

where m is the number of matching characters, m is the number of matching characters, t is half the number of transpositions, l is the length of common prefix at the start of the string up to a maximum of 4 characters, p is a constant scaling factor for how much a character score $d_j$ is adjusted upwards when the two text strings S1 and S2 have common prefixes, $l_{s1}$ is the length of string S1, and $l_{s2}$ is the length of string S2.

An alternate similarity or distance measurement method (herein after "Distance Measurement Method One") may use a matrix searching technique for comparing characters of the two text strings S1 and S2 while measuring the similarity or distance between of the two text strings S1 and S2, in accordance with the principles of the disclosure herein.

Distance Measurement Method One may involve determining the similarity between the two (e.g., unequal) text strings S1 and S2 taking into account missing consonants and missing characters, wrong characters (i.e. misspelled characters), transposition of characters, misplaced characters, prefix and suffix matching. The matrix searching technique used in Distance Measurement Method One may be more efficient or faster than use of nested loops for determining the similarity distance between of the two text strings S1 and S2.

Nomenclature matching application 110 may use Distance Measurement Method One to measure the distance d between text strings S1 and S2 by comparing and matching each character of text string (e.g., string S1) with a reference text string (e.g., string S2). The distance d between the two text strings S1 and S2 may be calculated from a mathematical formula:

$$d = \begin{cases} 0 & \text{if } m = 0 \\ \frac{1}{5}\left(\beta\frac{m}{l_{Sref}} + \alpha\frac{m-t}{m} + \beta\frac{m-m_s}{m} + \beta\frac{m-m_p}{m} + \beta\frac{m-m_c}{m}\right) & \text{otherwise} \end{cases}$$

$$dist = d + lp(1-d) + ls(1-d)$$

where β is a weighting constant (e.g., β=0.225), α is a weighting constant (e.g., α=0.1), m the number of matching characters, t the number of transpositions, l is the length of common prefix at the start of the string up to a maximum of 3 characters, p is a constant scaling factor for how much the score is adjusted upwards for having common prefix (e.g., p=0.1), s a constant scaling factor for how much the score is adjusted upwards for having common suffix (e.g., s=0.10, $m_s$ the number of misspelt characters, $m_p$ is the number of misplaced characters, $m_c$ is the number of missing characters, and l is the length of a reference string.

It will be noted that the foregoing equation. Like the Jaro-Winkler equation, normalizes distance d between text strings S1 and S2 to 1 for perfect or exact matching (i.e. when all characters match) and to 0 when no characters match (i.e. d=0 for m=0). A distance metric (e.g., d≥0.9) may be used by nomenclature matching application 110 to determine that string S1 and string S2 match and represent the same word.

With renewed reference to FIG. 1, in an example implementation of system 100, nomenclature matching application 110 may be configured to separately compare and match attribute data fields (e.g., vendor, product, version attribute data fields) of a software system or component name (e.g., name1) and a vulnerability name (e.g., X1) to determine whether the software component is a vulnerable software component. In response to a vulnerability (e.g., $X_{new}$) identified, for example, in NVD data feed 132 or SAMS 152, nomenclature matching system 100 may search the name data records (e.g., name1, name2, name3, etc.) in database 120 attribute field-by-attribute field (e.g., by vendor, product and version attribute fields) to identify one or more software system or component names that have the same or similar attribute data as vulnerability name $X_{new}$. Software systems or components having names that have the same or similar attribute data as vulnerability name $X_{new}$ may be identified as corresponding to software systems or components having the vulnerability $X_{new}$. Nomenclature matching application 110 may display (e.g., on user interface 35) such software system or component names to inform various stakeholders (e.g. stakeholders 140) of the software systems or components likely to have vulnerability $X_{new}$.

In the example implementation, software systems and component names in database 120 may be formatted, for example, in a format consistent with the Common Platform Enumeration (CPE) standard (which is used, e.g., by NIST for the NVD) or any other standard. Under the CPE standard, a software system or component name (e.g., name1) in database 120 may have a format for vendor, product and version attribute data text strings, for example, as follows:

```
name1 =
  <"vendor_name_1";"vendor_name_2";...;"vendor_name_n">
  <"product_name"><"version">.
```

It will, however, be understood that CPE standard (or other similar standard) does not mandate that all of the vendor, product and version attribute data fields in a name should be populated. Various software systems and component names in database 120 may, for example, variously include data for all or only some of the vendor, product and version attribute data fields.

In the example implementation, nomenclature matching application 110 may, for example, first, search of database 120 to match software and component names by the vendor attribute dimension to obtain partial matching results (i.e. "vendor" matched names). Nomenclature matching application 110 may measure inter-string distances (e.g., using Distance Measurement Method One) between the vendor attribute fields of $X_{new}$ and the vendor attribute fields of the names in database 120 to obtain the partial matching results (i.e. "vendor" matched names). These partial matching results may be used to generate product attribute and version attribute "sub-lists" of the partially matched (i.e. vendor-matched) names in database 120. Nomenclature matching application 110 may then search the product and version attribute sub-lists in turn to find software and component names having product and version attributes that match the product and version attributes of $X_{new}$. In cases where no "exact" match is found for the vendor, product or version attributes of $X_{new}$, a most "probable" match may be generated.

Figure 2:
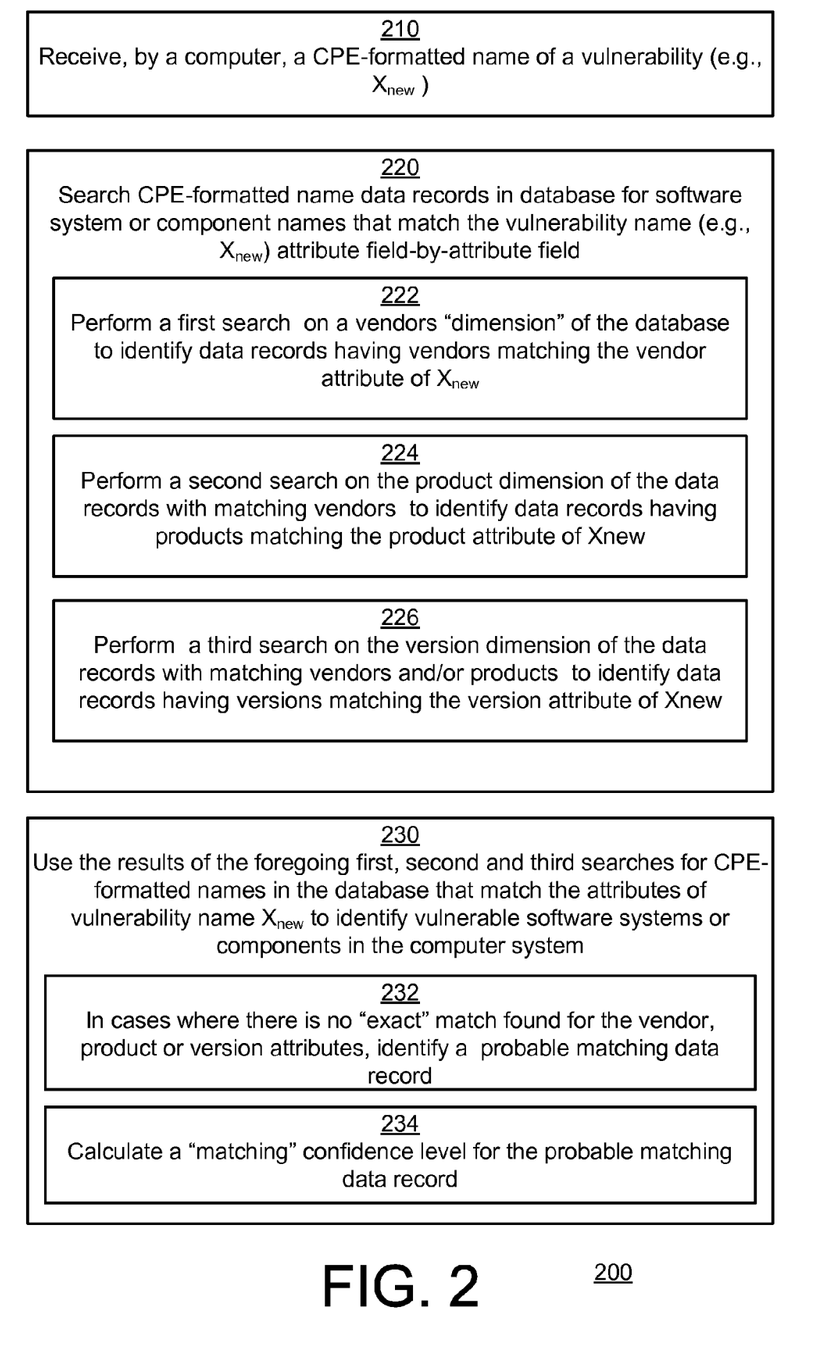
FIG. 2 is a flowchart illustrating an example method implemented by nomenclature matching application to secure a computer system by identifying vulnerable software systems or components in the computer system, in accordance with the principles of the present disclosure.

FIG. 2 shows a flowchart of an example method 200 that may be implemented by nomenclature matching application 110 to secure a computer system by identifying vulnerable software systems or components in the computer system, in accordance with the principles of the present disclosure.

Method 200 may involve receiving, by a computer, a CPE-formatted name of a vulnerability (e.g., $X_{new}$) (210) and searching CPE-formatted name data records in database 120 for software system or component names that match the vulnerability name (e.g., $X_{new}$) attribute field-by-attribute field (220). Data records or lists of CPE-formatted software and component names in database 120 may be organized as Vendor, Product and Version lists, and serve as the imprecise input data for method 200. Method 200 may be configured to measure the distance between any two text strings using, for example, Distance Measurement Method One. The two text strings may be an exact match when the measured distance is equal to 1. However, to account for the imprecision of the software and component names in database 120, two text strings may be deemed to match or be the same if the measured distance satisfies a pre-determined distance matching criteria (e.g., d≥0.9).

Method 200 may include performing a first search on the vendors "dimension" of database 120 to identify data records having vendors matching the vendor attribute of $X_{new}$ (222). The results of the first search may be a list of data records with matching vendors (e.g., sub list 1). If matching vendors are found (e.g., sub-list 1≠0), method 200 may include performing a second search on the product dimension of the data records with matching vendors (sub-list 1) to identify data records having products matching the product attribute of $X_{new}$ (224). The results of the second search may be a list of data records with matching vendors and matching products (sub-list 2). If no matching vendors are found (e.g., sub-list 1=0), the second search may be performed on the product "dimension" of database 120 to identify data records having products matching the product attribute of $X_{new}$ (sub-list 2). Method 200 may further include performing a third search on the version dimension of the records with matching vendors and/or products (sub-list 2) to identify data records having versions matching the version attribute of $X_{new}$ (226). The results of the third search may be a list of data records with matching vendors, products and versions (sub-list 3).

Method 200 may include using the results of the foregoing first, second and third searches for CPE-formatted names in database 120 that match the attributes of vulnerability name $X_{new}$ to identify vulnerable software systems or components in the computer system (230). There may be seven possible outcomes of foregoing first, second and third searches. A first possible outcome may be "Exact match found" (e.g., when the measured distances for all three searches equal to 1). The other six possible outcomes may include "Vendor, Product, and Version found," "Vendor and Product Found but Version was not Found," "Vendor Found but Product not found," "Product and Version Found but Vendor not found," "Product Found but Vendor and Version not found," and "Vendor and Product Not Found," (e.g., in cases where the measured distances for all three searches do not equal 1 or where the data records do not include attribute data for one or more of the vendor, product and version attributes).

Software systems or components in the computer system may be identified by name as being vulnerable based on the foregoing possible outcomes. In cases where there is no "exact" match found for the vendor, product or version attributes, method 200 may include identifying a most probable matching data record (232). Method 200 may include calculating a "matching" confidence level for the probable matching data record (e.g., as a weighted sum of the distances of the matched vendor, product and version attribute strings) (234). For example, method 200 may use the following equation to calculate a confidence level C:

$$C=0.4Ds(Iv, Mv)+0.59Ds(Ip, Mp)+0.01Ds(Ivr, Mvr),$$

where Ds is the distance between two text strings, IV is the input vendor string, Mv is the matched vendor string, Ip is the input vendor string, Mp is the matched vendor string, Ivr is the input version string, and Mvr is the matched version string. Information on the software systems or components in the computer system identified by name as being vulnerable and the confidence level of such identification may be provided, for example, to one or more computer system stakeholders and agents who may be involved in securing the computer system.

In some scenarios, there may be an attribute-naming ambiguity in the CPE-formatted name data records in database 120 for software system or component names. For example, many FOSS components have names in which there may be no clear distinction between vendor and product attributes, the order of the vendor and product attributes may be interchanged, or the vendor attribute data may be missing (e.g., with the FOSS component identified only by product name). For such scenarios, method 200 may have to be modified or extended to resolve any possible ambiguity between vendor and product attribute data.

Figure 3:
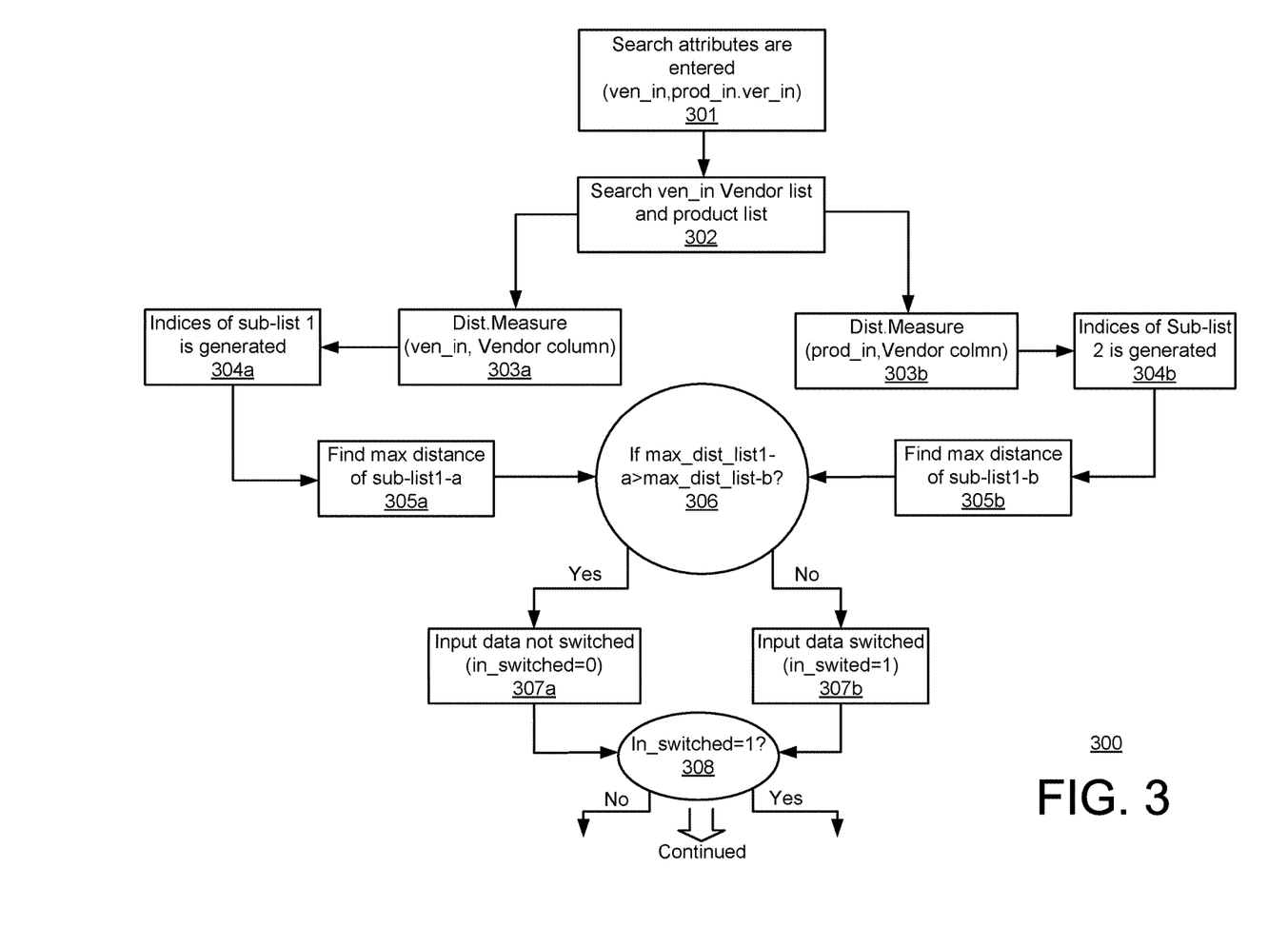
FIG. 3 is a flowchart illustrating an example method that may be implemented by a nomenclature matching application to identify vulnerable software systems or components in a computer system in scenarios where there is an attribute-naming ambiguity in data records of software system or component names, in accordance with the principles of the present disclosure.

FIG. 3 shows a flowchart of an example method 300 (including extensions and modifications to method 200) that may be implemented by nomenclature matching application 110 to identify vulnerable software systems or components in a computer system in scenarios where there may be an attribute-naming ambiguity in the data records of software system or component names, in accordance with the principles of the present disclosure.

To resolve an ambiguity between vendor and product attribute data (i.e., whether the two attributes are switched with each other) in the data records of software system or component names, method 300 may include measuring the distance between the vendor attribute of $X_{new}$ and all the potential matching vendors in the CPE-formatted name data records in database 120. A list of data records having vendors with a distance measure of more than a predetermined threshold (e.g., 0.9) may be created (e.g. a list of matching vendors, sub-list-1-*a*). Method 300 may further include measuring the distance between the product attribute of $X_{new}$ and all the potential matching products in the data in database 120 and similarly create a list of matching products (e.g., sub-list-1-*b*). To resolve the ambiguity between vendor and product attribute data (i.e., whether the two attributes are switched with each other), method 300 may include comparing the vendor in sub-list1-*a* having a maximum distance (max_dist_list-1-*a*) with the product in sub-list-1-*b* having a maximum distance (max_dist_list-1-*b*). If the max_dist_list-1-*a* is greater than max_dist_list-1-*b* (or if max_dist_list-1-*a* is equal to 1.0) then the vendor and attribute data may be likely not switched. Conversely, if the max_dist_list-1-*a* is less than max_dist_list-1-*b*, the vendor and product attribute data may be likely switched. If the search vendor and product attribute data are not switched then sub-list-1 should equal to sub-list1-*a*. Conversely, if the vendor and product attribute data are switched then sub-list-1 should equal sub-list1-*b*. In case the vendor and product attribute data are not switched, further searches may be performed on the product dimensions of the records with matching vendors (sub-list 1) to identify products that may match the product attribute of $X_{new}$. In case the vendor and product attribute data are switched, then method 300 may include performing further searches on the vendor dimensions of the records with matching vendors (sub-list 1-*b*=sub-list 1) to identify products that may match the vendor attribute of $X_{new}$ (recognizing that the vendor and product attributes have been switched).

If no product matches are found, method 300 may include outputting the list of records with matching vendors (sub-list 1) as the list of vulnerable software systems or components in the organization's computer systems. In case product matches are found, then a sub-list2 may be created from sub-list1. Method 300 may include searching sub-list2 against ver_in using the same distance measurement matching criteria. If version matching is not found then sub-list2 is displayed as output. In case a match is found then sub-list2 is narrowed down to sub-list3 and displayed as output.

With reference to FIG. 3, method 300 may begin with entering "vulnerability" search attributes (e.g., ven_in, prod_in, ver_in) corresponding to vendor, product and version attribute data in vulnerability name $X_{new}$ (301) and, initially, searching for and identifying records in the Vendor list and Product list that have attribute data matching search attribute ven_in (302). Identifying records matching search attribute ven_in in the Vendor list and Product list 302 may involve measuring distances (using for example, Distance Measurement Method One) between the search attribute (i.e. ven_in) and the attribute data in the Vendor list and Product list. In particular, method 300 may, for the Vendor list, include: distance measurements (ven_in, Vendor column) (303*a*); generating indices of sub-list 1*a* of records having attribute data matching search attribute ven_in (304*a*); and finding a maximum distance of sub-list 1*a* (305*a*), and, for the Product list, include: distance measurements (ven_in, Product column) (303*b*); generating indices of sub-list 1*b* of records having attribute data matching search attribute ven_in (304*b*); and finding a maximum distance of sub-list 1*b* (305*b*).

Method 300 may further involve determining if max_dist of sub-list 1*a* is greater than the max_dist of sub-list 1*b* (306) and accordingly, determining if the input data (e.g., sub-list 1*a* and sub-list 1*b*) should be switched (e.g., input data not switched (in_switched=0) (307*a*), and input data switched (in_switched=1) (307*b*)). Method 300 may further involve, at 308, confirming whether the input data (e.g., sub-list 1*a* and sub-list 1*b*) has been switched (e.g., in_switched=1).

If the input data is not switched at 308, method 300 may involve searching for the search attribute prod-in in the product column of sub-list 1*a* (309*a*) and measuring the distance (prod-in, product column) (310*a*). If the input data is switched at 308, method 300 may involve searching for the search attribute ven_in in the product column of sub-list 1*b* (309*b*) and measuring the distances (prod_in, product column) (310*b*). In either case, method 300 may involve determining if products (matching search attribute prod_in) are found in sub-list 1*a* or sub-list 1*b* (311).

If matching products are found, method 300 may involve generating a sub-list 3, which includes records having product attribute values matching search attribute prod_in (312). Method 300 may further involve searching for the search attribute ver-in in the version column of sub-list 3 (313) and measuring the distance (ver_in, version column) (314).

Method 300 may further involve determining if versions (matching search attribute ver_in) are found in sub-list 3 (315). If matching products are found, method 300 may involve generating a sub-list 3, which includes records having version attribute values matching search attribute ver_in (216).

When matching products are not found at 311, method 300 may include calculating a confidence level of the matching of search attribute ven-in with records in the input data (sub-list 1=sub-list 1*a* or sub-list 1*b*) thus far. When matching versions are not found at 315, method 300 may include calculating a confidence level of the matching of search attributes ven-in and prod_in with records in the input data (e.g., sub-list 3) thus far. Similarly, when matching versions are found at 315, method 300 may include calculating a confidence level of the matching of search attributes ven-in, prod_in, and ver_in with records in the input data (e.g., sub-list 3) thus far.

After calculating the confidence levels for sub-list1, sub-list 3 or sub-list 3 (at 317*a*, 318*a* or 319*a*), method 300 may involve sorting the respective matched sub-lists by confidence level at 317*b*, 318*b* and 319*b* and displaying the sorted sub-lists at 317*c*, 318*c* and 319*c*, respectively.

Displaying the sorted sub-lists (at 317*c*, 318*c* and 319*c*) may include displaying the results, for example, on user interface 35, or otherwise making the results available to one or more stakeholders 140

The systems (e.g., system 100) and methods (e.g., method 200 and method 300) may be configured for automatic monitoring of vulnerabilities in an organization's computer systems/software systems that are reported by third parties. Various stakeholders or agents may be automatically informed of any vulnerability that is found in the organization's computer systems. The stakeholders or agents may then be able to take prompt corrective actions to secure the organization's computer systems, for example by blocking access to or operations of the vulnerable software systems or components in the organization's computer systems.

The various systems and techniques described herein may be implemented in digital electronic circuitry, or in computer hardware, firmware, or in combinations of them. The various techniques may implemented as a computer program product, i.e., a computer program tangibly embodied in a machine readable storage device, for execution by, or to control the operation of, data processing apparatus, e.g., a programmable processor, a computer, or multiple computers.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the disclosure.

What is claimed is:

1. A method for securing a computer system, the method comprising:
   receiving, by a computing device, a standardized name of a software vulnerability, the standardized name complying to industry naming standards for software components, the industry naming standards including the Common Platform Enumeration (CPE) naming standard for naming software systems used by the National Institute of Standards and Technology (NIST);
   accessing, by the computing device, a list of names of software systems and components of a computer system, the list of names including one or more unstandardized names for one or more of the software systems and components;
   measuring, by the computing device, a lexical similarity distance between the vulnerability name and each of the software system and component names in the list including the one or more unstandardized names, the measuring of the lexical similarity distance including a matrix searching technique that involves receiving a CPE-formatted name of a vulnerability and searching CPE-formatted name data records for software system or component names that match the vulnerability name attribute field-by-attribute field;
   identifying the software system and component names including the one or more unstandardized names that are within a predetermined similarity distance of the vulnerability name as corresponding to software systems and components having the software vulnerability; and
   securing the computer system by applying patches securing the identified software systems and components including the identified software systems and components with unstandardized names having the software vulnerability,
   wherein measuring a lexical similarity distance between the vulnerability name and each the software system and component names in the list includes determining a similarity distance between the two text strings S1 and S2 as:

$$d = \begin{cases} 0 & \text{if } m = 0 \\ \frac{1}{5}\left(\beta\frac{m}{l_{Sref}} + \alpha\frac{m-t}{m} + \beta\frac{m-m_s}{m} + \beta\frac{m-m_p}{m} + \beta\frac{m-m_c}{m}\right) & \text{otherwise} \end{cases}$$

$$dist = d + lp(1-d) + ls(1-d)$$

where β is a weighting constant, α is a weighting constant, m is the number of matching characters, t is the number of transpositions, l is the length of common prefix at the start of the string up to a maximum of 3 characters, p is a constant scaling factor for how much the score is adjusted upwards for having common prefix, s is a constant scaling factor for how much the score is adjusted upwards for having common suffix, ms is the number of misspelt characters, mp is the number of misplaced characters, mc is the number of missing characters, and l is the length of a reference string.

2. The method of claim 1, wherein the vulnerability name and each the software system and component names include name attributes, and wherein measuring a lexical similarity distance between the vulnerability name and each the software system and component names in the list includes searching the list, attribute field-by-attribute field, to find software system and component names having name attributes matching the name attributes of the vulnerability name.

3. The method of claim 2, wherein the name attributes include one or more of a vendor attribute, a product attribute and a version attribute, and wherein identifying the software system and component names within a predetermined similarity distance of the vulnerability name includes performing a first search on a vendor dimension of the list to identify a first sub-list of data records having vendors matching the vendor attribute of the vulnerability name.

4. The method of claim 3, further comprising, performing a second search on a product dimension of the first sub-list to identify a second sub-list of data records having products matching the product attribute of the vulnerability name.

5. The method of claim 4, further comprising, when no data records having products matching the product attribute of the vulnerability name are found in the first sub-list, outputting the first sub-list as the names of software systems and components having the software vulnerability.

6. The method of claim 4, further comprising, performing a third search on a version dimension of the second sub-list to identify a third sub-list of data records having products matching the version attribute of the vulnerability name.

7. The method of claim 6, further comprising, outputting the third sub-list as the names of software systems and components having the software vulnerability.

8. The method of claim 6, further comprising, when no data records having versions matching the version attribute of the vulnerability name are found in the second sub-list, outputting the second sub-list as the names of software systems and components having the software vulnerability.

9. The method of claim 1, wherein receiving a name of a software vulnerability includes receiving an online data feed from the National Vulnerabilities Database (NVD).

10. A system for securing a computer system, the computer system having a list of software system and component names stored in a database, the system for securing the computer system comprising a memory and a semiconductor-based processor, the memory and the processor forming one or more logic circuits configured to:
receive, by a computing device, a standardized name of a software vulnerability, the standardized name complying to industry naming standards for software components, the industry naming standards including the Common Platform Enumeration (CPE) naming standard for naming software systems used by the National Institute of Standards and Technology (NIST);
access, by the computing device, a list of names of software systems and components of a computer system, the list of names including one or more unstandardized names for one or more of the software systems and components;
measure, by the computing device, a lexical similarity distance between the vulnerability name and each of the software system and component names in the list, the measuring of the lexical similarity distance including a matrix searching technique that involves receiving a CPE-formatted name of a vulnerability and searching CPE-formatted name data records for software system or component names that match the vulnerability name attribute field-by-attribute field;
identify the software system and component names including the one or more unstandardized names that are within a predetermined similarity distance of the vulnerability name as corresponding to software systems and components having the software vulnerability; and
secure the computer system by applying patches securing the identified software systems and components including the identified software systems and components with unstandardized names having the software vulnerability,
wherein the logic circuits are configured to determine a similarity distance between two text strings S1 and S2 as:

$$d = \begin{cases} 0 & \text{if } m = 0 \\ \frac{1}{5}\left(\beta \frac{m}{l_{Sref}} + \alpha \frac{m-t}{m} + \beta \frac{m-m_s}{m} + \beta \frac{m-m_p}{m} + \beta \frac{m-m_c}{m}\right) & \text{otherwise} \end{cases}$$

$$dist = d + lp(1-d) + ls(1-d)$$

where β is a weighting constant, α is a weighting constant, m is the number of matching characters, t is the number of transpositions, l is the length of common prefix at the start of the string up to a maximum of 3 characters, p is a constant scaling factor for how much the score is adjusted upwards for having common prefix, s is a constant scaling factor for how much the score is adjusted upwards for having common suffix, $m_s$ is the number of misspelt characters, $m_p$ the number of misplaced characters, $m_c$ is the number of missing characters, and l is the length of a reference string.

11. The system of claim 10, wherein the vulnerability name and each the software system and component names include name attributes, and wherein the logic circuits are configured to search the list, attribute field-by-attribute field, to find software system and component names having name attributes matching the name attributes of the vulnerability name.

12. The system of claim 11, wherein the name attributes include one or more of a vendor attribute, a product attribute and a version attribute, and wherein the logic circuits are configured to perform a first search on a vendor dimension of the list to identify a first sub-list of data records having vendors matching the vendor attribute of the vulnerability name.

13. The system of claim 12, wherein the logic circuits are configured to perform a second search on a product dimension of the first sub-list to identify a second sub-list of data records having products matching the product attribute of the vulnerability name.

14. The system of claim 13, wherein the logic circuits are configured to perform a third search on a version dimension of the second sub-list to identify a third sub-list of data records having versions matching the version attribute of the vulnerability name.

15. The system of claim 10, wherein the logic circuits are configured to receive the name of the software vulnerability via an online data feed from the National Vulnerabilities Database (NVD).

16. A non-transitory computer readable storage medium having instructions stored thereon, including instructions which, when executed by a microprocessor, cause a computing device to:

receive, by a computing device, a standardized name of a software vulnerability, the standardized name complying to industry naming standards for software components, the industry naming standards including the Common Platform Enumeration (CPE) naming standard for naming software systems used by the National Institute of Standards and Technology (NIST);

access, by the computing device, a list of names of software systems and components of a computer system, the list of names including one or more unstandardized names for one or more of the software systems and components; measure, by the computing device, a lexical similarity distance between the vulnerability name and each of the software system and component names in the list, the measuring of the lexical similarity distance including a matrix searching technique that involves receiving a CPE-formatted name of a vulnerability and searching CPE-formatted name data records for software system or component names that match the vulnerability name attribute field-by-attribute field;

identify the software system and component names including the one or more unstandardized names that are within a predetermined similarity distance of the vulnerability name as corresponding to software systems and components having the software vulnerability; and secure the computer system by applying patches securing the identified software systems and components including the identified software systems and components with unstandardized names having the software vulnerability, wherein the computing device determines a similarity distance-between two text strings S1 and S2 as:

$$d = \begin{cases} 0 & \text{if } m = 0 \\ \frac{1}{5}\left(\beta\frac{m}{l_{Sref}} + \alpha\frac{m-t}{m} + \beta\frac{m-m_s}{m} + \beta\frac{m-m_p}{m} + \beta\frac{m-m_c}{m}\right) & \text{otherwise} \end{cases}$$

$$dist = d + lp(1-d) + ls(1-d)$$

where $\beta$ is a weighting constant, $\alpha$ is a weighting constant, m is the number of matching characters, t is the number of transpositions, l is the length of common prefix at the start of the string up to a maximum of 3 characters, p is a constant scaling factor for how much the score is adjusted upwards for having common prefix, s is a constant scaling factor for how much the score is adjusted upwards for having common suffix, $m_s$ is the number of misspelt characters, $m_p$ the number of misplaced characters, $m_c$ is the number of missing characters, and l is the length of a reference string.

17. The non-transitory computer readable storage medium of claim 16, wherein the vulnerability name and each the software system and component names in the list include name attributes, and wherein instructions stored on non-transitory computer readable storage medium include instructions which cause the computing device to search the list, attribute field-by-attribute field, to find software system and component names having name attributes matching the name attributes of the vulnerability name.

* * * * *